United States Patent [19]

Lee

[11] Patent Number: 5,685,339
[45] Date of Patent: Nov. 11, 1997

[54] HOT/COLD WATER FLOWRATE CONTROL DEVICE

[76] Inventor: Chin-Tsai Lee, P.O. Box 82-144, Taipei City, Taiwan

[21] Appl. No.: 670,064

[22] Filed: Jun. 25, 1996

[51] Int. Cl.$^6$ .................................................. F16K 11/076
[52] U.S. Cl. ........................ 137/625.41; 251/287
[58] Field of Search .................. 137/625.41; 251/287

[56] References Cited

U.S. PATENT DOCUMENTS

| | | | |
|---|---|---|---|
| 3,322,152 | 5/1967 | Aechter | 137/625.41 |
| 3,796,231 | 3/1974 | Hare | 137/625.41 |
| 5,469,889 | 11/1995 | Tang | 137/625.41 |

*Primary Examiner*—John Fox
*Attorney, Agent, or Firm*—Alfred Lei

[57] ABSTRACT

A hot/cold water flowrate control device, including a casing having a cold water inlet and a hot water inlet respectively connected a hot/cold water supply system and defining a ball socket, a hollow ball cap fixed to the casing, a ball valve mounted in the ball socket and having a neck extending out of the ball cap and a stepped locating groove on the outside, the stepped locating groove having a deep sliding groove section in the middle, two deep locating groove sections at two opposite sides, and two shadow borderline groove sections disposed between the deep sliding groove section and the deep locating groove sections, a water outlet pipe connected to the neck outside the ball cap, a spring-supported locating rod mounted in the ball socket and moved in a stepped locating groove in the periphery of the ball valve, wherein water is stopped from passing to the water outlet pipe when the locating rod is forced into engagement with one of the locating groove sections of the stepped locating groove; the cold (hot) water inlet of the casing is connected to the water passage of the ball valve and the hot (cold) water inlet is disconnected from the water passage of the ball valve when the locating rod is moved in the sliding groove section to one side thereof.

4 Claims, 7 Drawing Sheets

HOT/COLD WATER FLOWRATE CONTROL DEVICE

BACKGROUND OF THE INVENTION

1. Field of the Invention

This invention relates to hot/cold water flowrate control devices, and relates more particularly to such a hot/cold water flowrate control device which can be conveniently operated to regulate the flowrate and temperature of water simply by pushing the water outlet pipe thereof.

2. Description of the Prior Art

Various hot/cold water flowrate control devices have been disclosed, and have appeared on the market. FIG. 1 shows a rotary knob-controlled type hot/cold water flowrate control device (20) according to the prior art. This rotary knob-controlled type hot/cold water flowrate control device (20) comprises two valves (23) driven by a respective rotary knob (21) to move along a respective screw rod (22) in opening/closing the respective water passage for hot water or cold water. Because hot water and cold water are respectively controlled by the valves (23), it is not easy to accurately regulate the temperature of water. Furthermore, when turning each rotary knob (21), the operator's hand tends to be contaminated. FIGS. 2 and 3 show a swivel lever-controlled hot/cold water flowrate control device (30). This structure of swivel lever-controlled hot/cold water flowrate control device (30) comprises a casing (34), a plurality of rotary members (33) mounted inside the casing (34), a control lever (31) pivoted to the casing (34), and a link (32) coupled between the control lever (31) and the rotary members (33). The flowrate of water is controlled by moving the control lever (31) relative to the casing (34) vertically. The temperature of water is controlled by turning the lever (31) about the casing (34) horizontally. This structure of swivel lever-controlled hot/cold water flowrate control device is expensive to manufacture and difficult to maintain. Furthermore, when operating the control lever (31), the operator's hand tends to be contaminated.

SUMMARY OF THE INVENTION

This invention relates to hot/cold water flowrate control devices.

It is one object of the present invention to provide a hot/cold water flowrate control device which can be conveniently operated to regulate the flowrate and temperature of water simply by pushing the water outlet pipe thereof without causing the hand to be contaminated. It is another object of the present invention to provide a hot/cold water flowrate control device which is simple in structure. It is still another object of the present invention to provide a hot/cold water flowrate control device which is inexpensive to manufacture. According to the preferred embodiment of the present invention, the hot/cold water flowrate control device comprises a casing having a cold water inlet and a hot water inlet respectively connected a hot/cold water supply system and defining a ball socket, a hollow ball cap fixed to the casing, a ball valve mounted in the ball socket and having a neck extending out of the ball cap and a stepped locating groove on the outside, the stepped locating groove having a deep sliding groove section in the middle, two deep locating groove sections at two opposite sides, and two shadow borderline groove sections disposed between the deep sliding groove section and the deep locating groove sections, a water outlet pipe connected to the neck outside the ball cap, a spring-supported locating rod mounted in the ball socket and moved in a stepped locating groove in the periphery of the ball valve, wherein water is stopped from passing to the water outlet pipe when the locating rod is forced into engagement with one of the locating groove sections of the stepped locating groove; the cold (hot) water inlet of the casing is connected to the water passage of the ball valve and the hot (cold) water inlet is disconnected from the water passage of the ball valve when the locating rod is moved in the sliding groove section to one side thereof.

DETAILED DESCRIPTION OF THE PREFERRED EMBODIMENT

Figure 1:
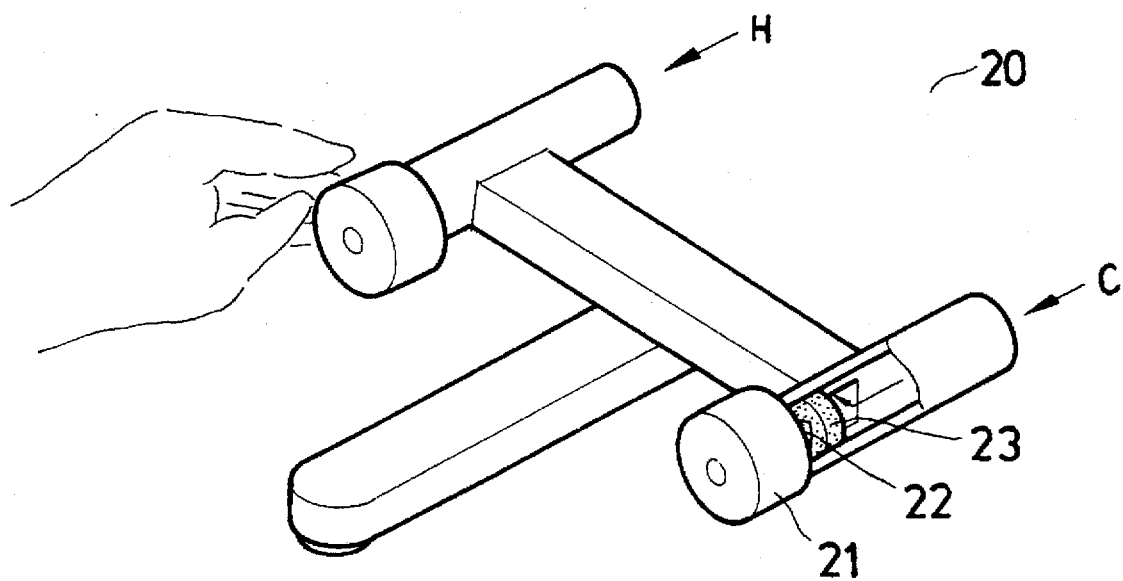
FIG. 1 shows a hot/cold water flowrate control device according to the prior art.
Figure 2:
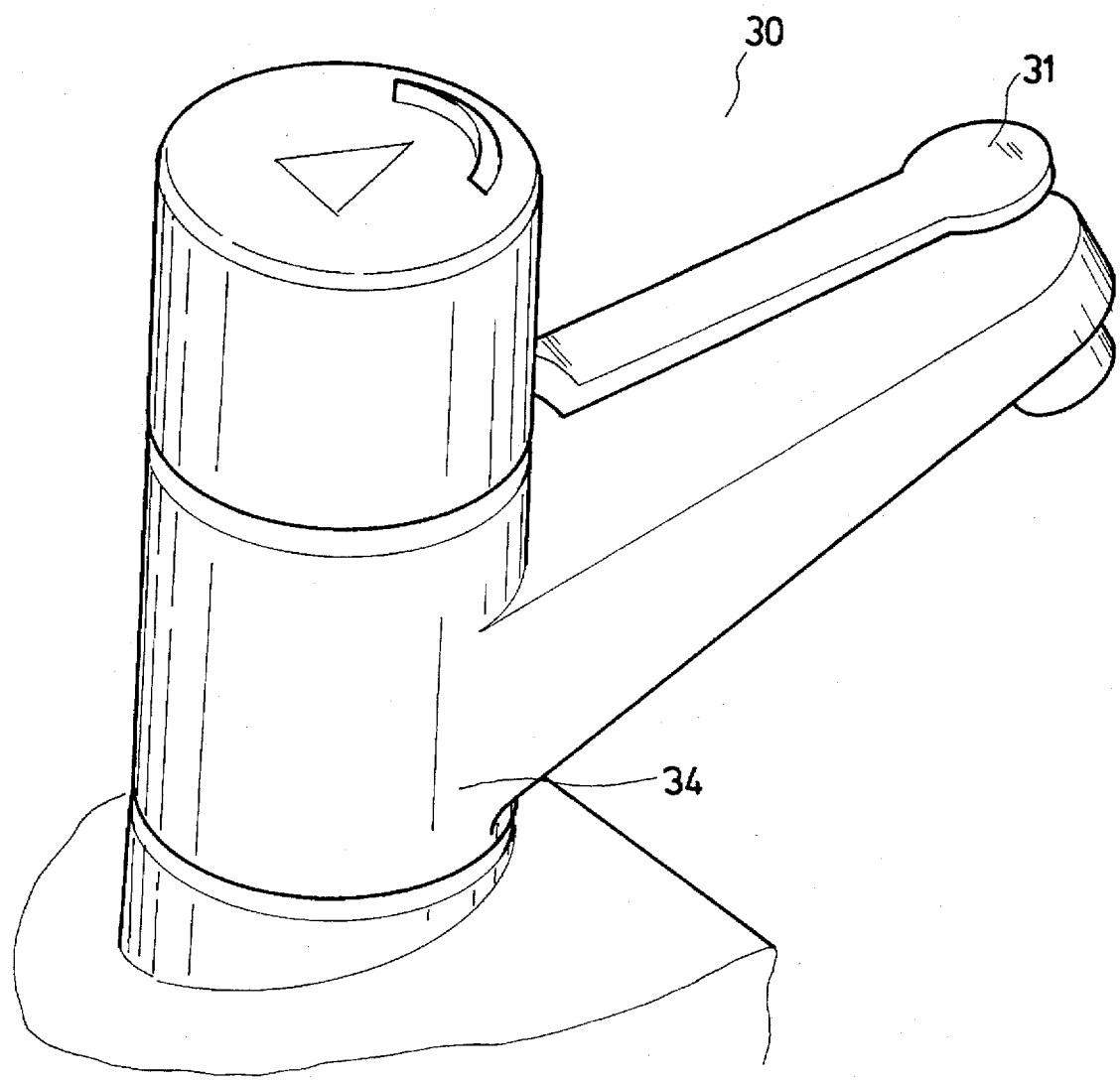
FIG. 2 shows another structure of hot/cold water flowrate control device according to the prior art.
Figure 3:
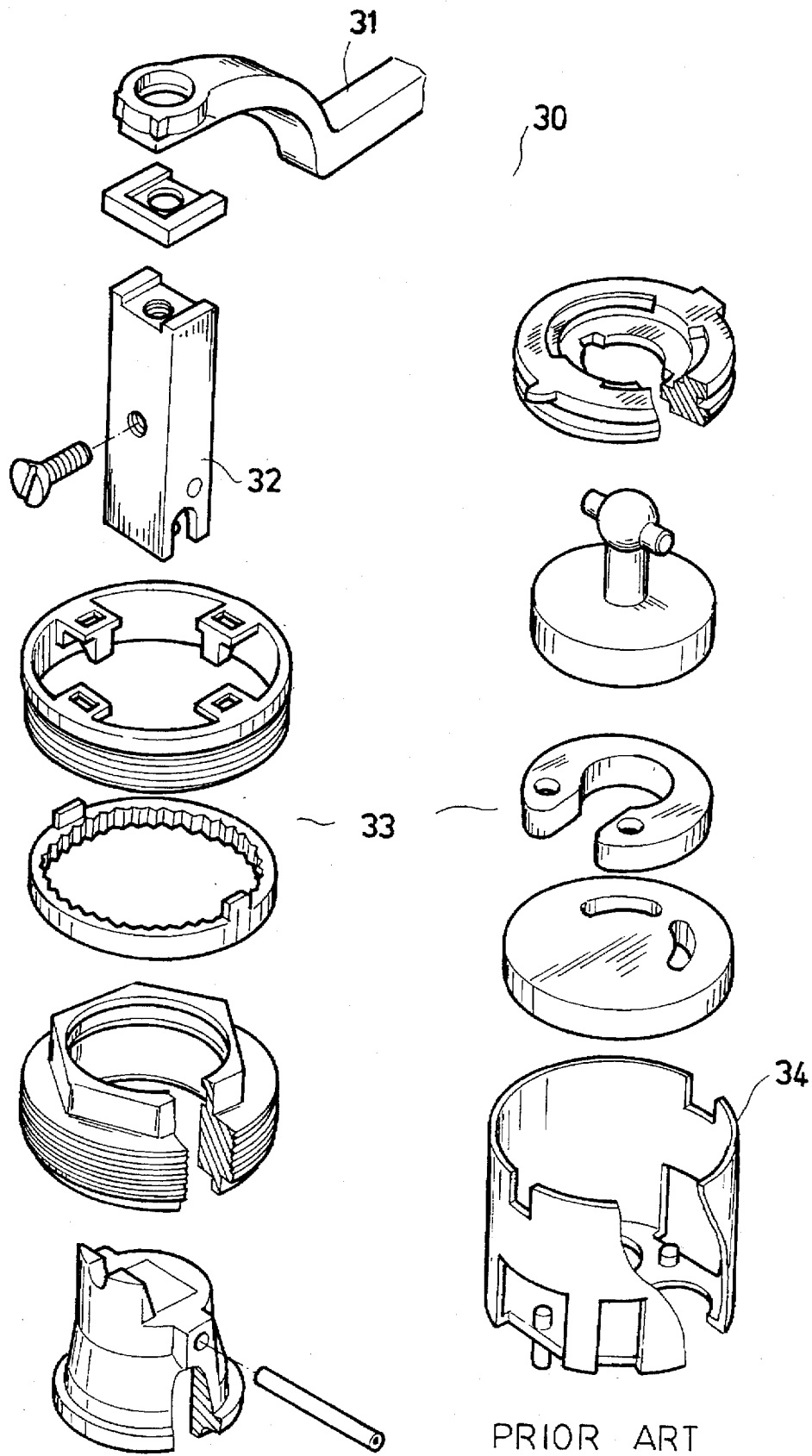
FIG. 3 is an exploded view of the prior art hot/cold water flowrate control device shown in FIG. 2.
Figure 4:
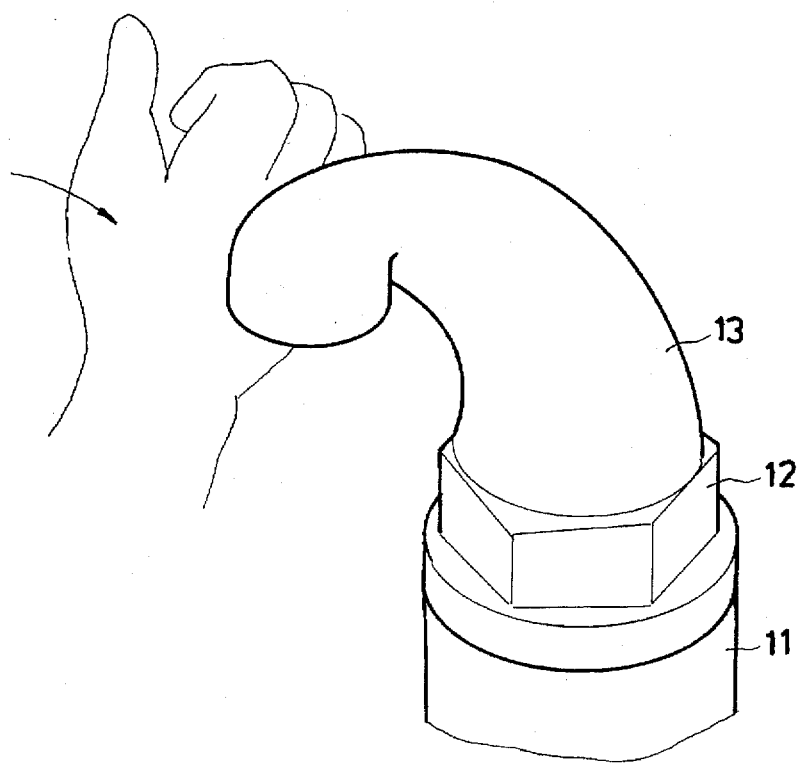
FIGS. 4 and 4A shows the application of a hot/cold water flowrate control device according to the present invention.
Figure 4A:
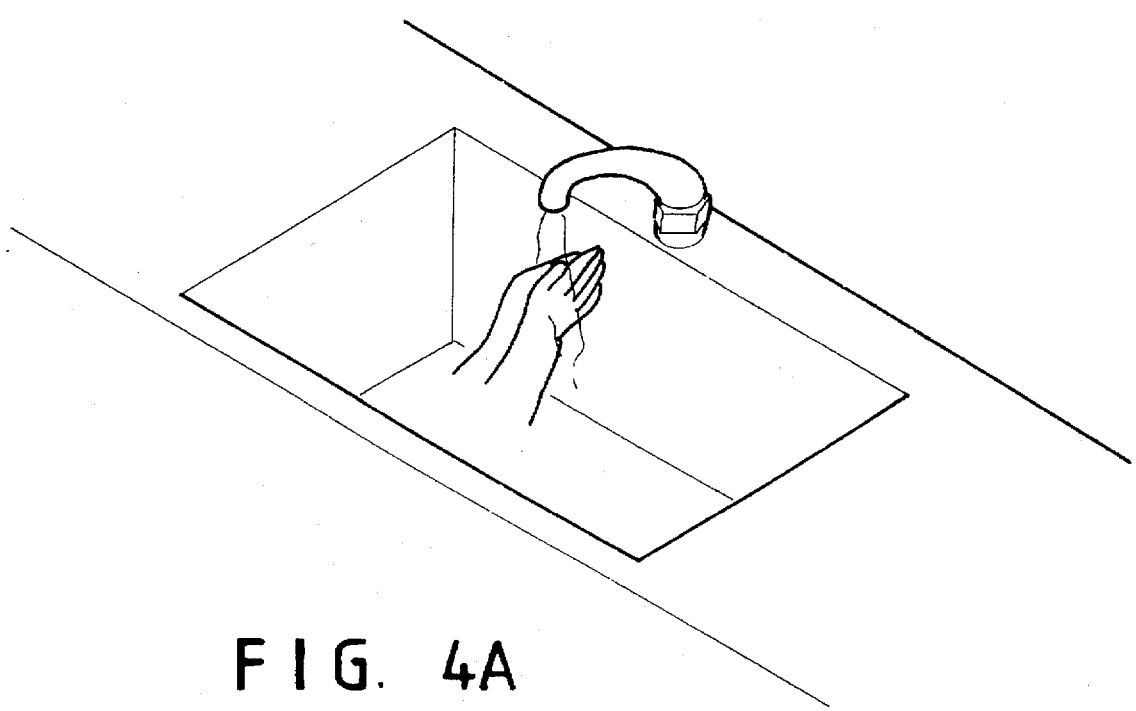
Figures 5, 5A:
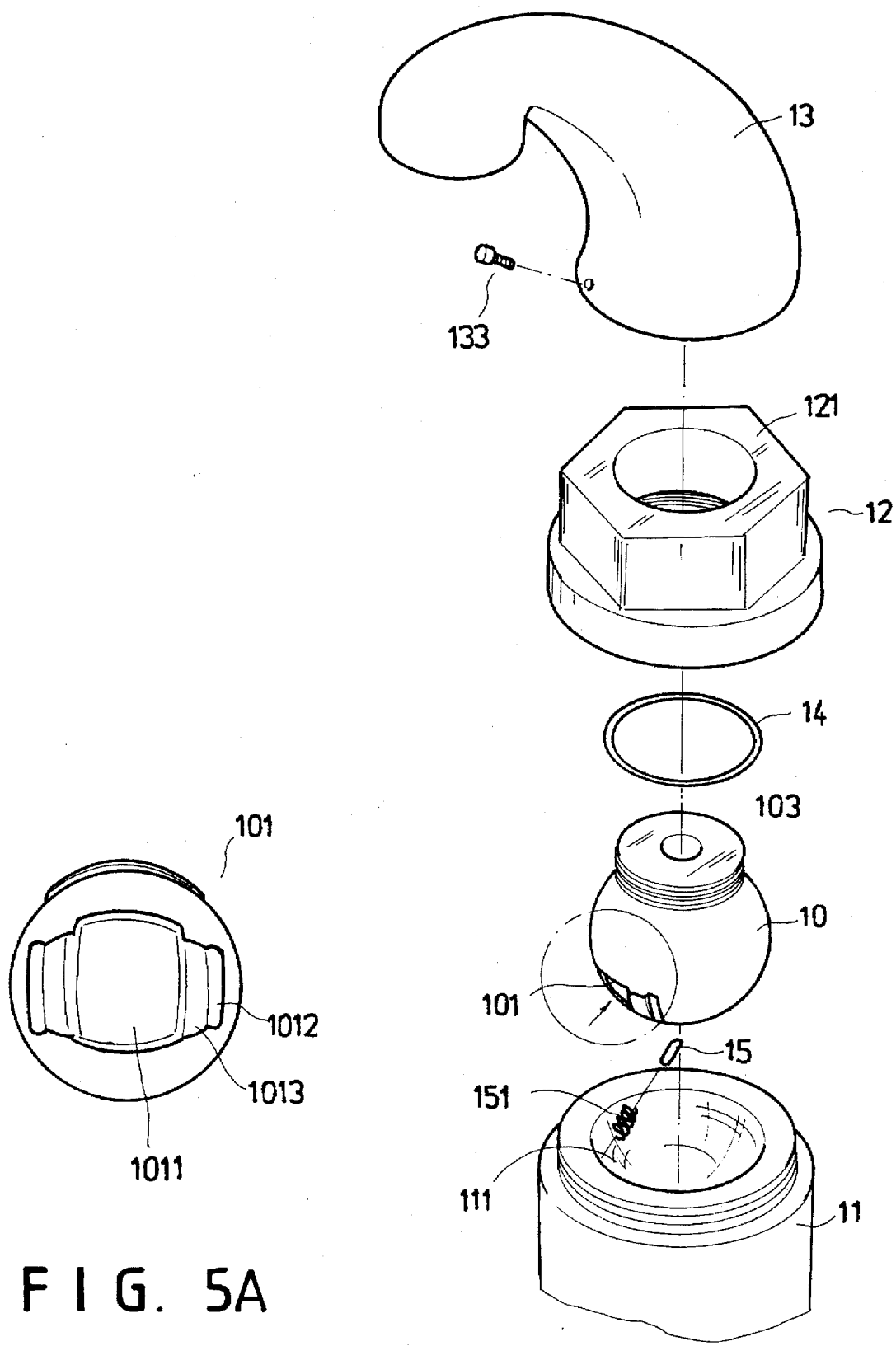
FIG. 5 is an exploded view of the preferred embodiment of the hot/cold water flowrate control device according to the present invention.
FIG. 5A is an enlarged view of a part of the ball valve shown in FIG. 5, showing the structure of the stepped locating groove.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 6:
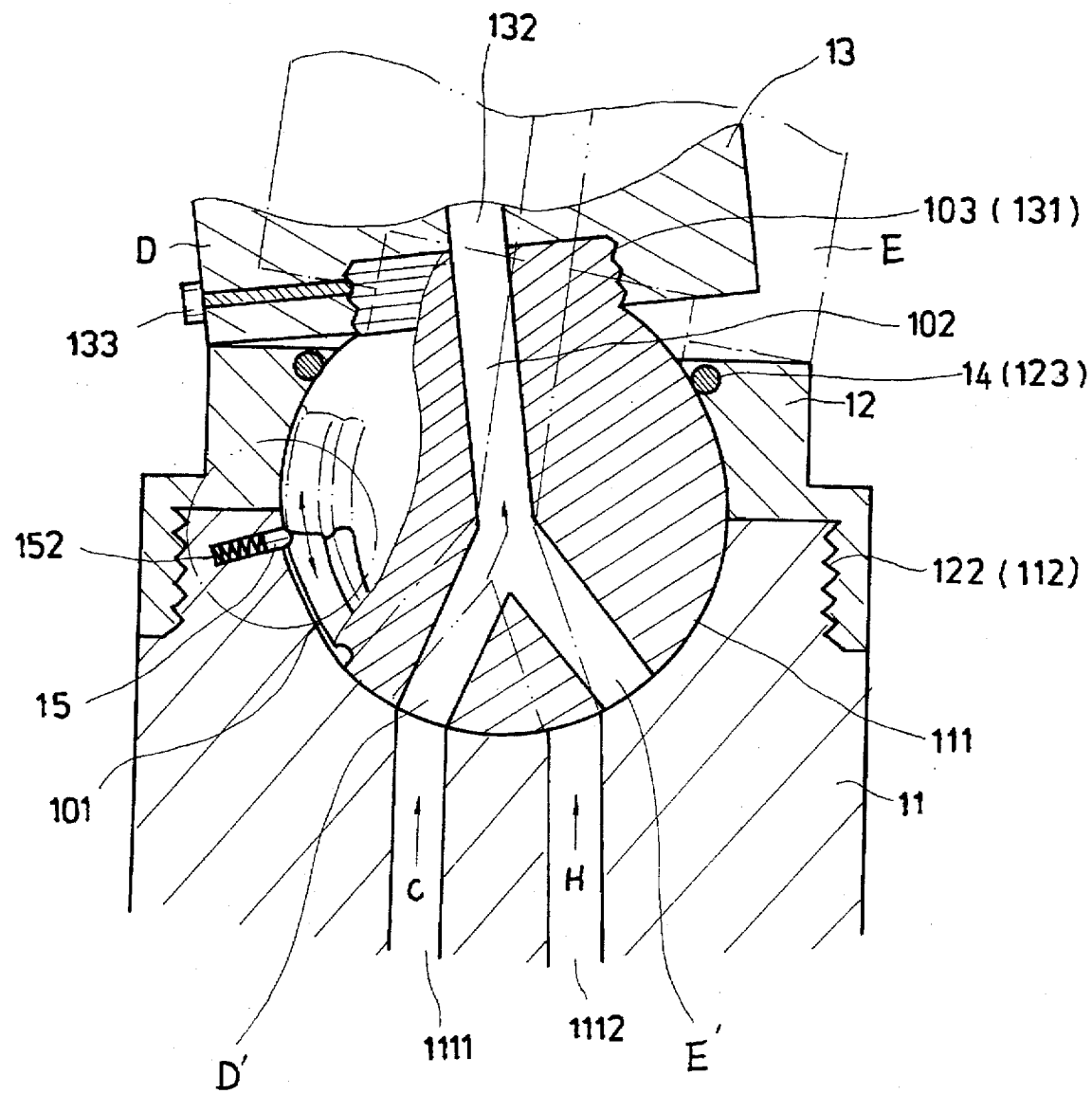
FIG. 6 is a sectional view of the present invention, showing the water outlet pipe moved, and the ball valve turned in the ball socket of the casing.

Referring to FIGS. 4, 4A, 5, and 6, a water flowrate control device 10 in accordance with the present invention is generally comprised of a casing 11, a ball valve 10, a ball cap 12, and a water outlet pipe 13. The ball valve 10 can be molded from plastic or ceramic, comprising an externally threaded neck 103 threaded into an inner thread 131 at one end of the water outlet pipe 13 and then fixed in place by a tightening up screw 133. As illustrated in FIG. 6, the ball valve 10 defines an invertedly disposed Y-shaped water passage 102. The straight top end of the water passage 102 is connected to the longitudinal water passage 132 of the water outlet pipe 13; the forked bottom end of the water passage 102 is adapted for the entering of hot water and cold water. The ball valve 10 further comprises a stepped locating recess 101 in the periphery. As illustrated in FIG. 5A, the stepped locating groove 101 is comprised of a deep sliding groove section 1011 in the middle, two deep locating groove sections 1012 at two opposite sides of the deep sliding groove section 1011, and two shadow borderline groove sections 1013 disposed between the deep sliding groove section 1011 and the deep locating groove sections 1012.

The ball cap 12 is mounted around the ball valve 10 and fixed to the casing 11, comprising a hollow hexagonal head 121 at the top through which the externally threaded neck 103 of the ball valve 10 passes, an inner thread 122 at the bottom adapted for coupling to the casing 11, and an inside annular groove 123 defined within the hollow hexagonal head 121 and adapted for receiving the rubber seal ring 14 (see FIG. 6). The casing 11 comprises an outer thread 112 threaded into the inner thread 122 of the ball cap 12, a ball socket 111 at the top, which receives the ball valve 10, a cold water inlet 1111 and a hot water inlet 1112, a blind hole 152 radially extending from the ball socket 11, a spring 151 mounted in the blind hole 152, a rod 15 supported on the spring 151 and forced by it into engagement with the stepped locating groove 101. The length of the rod 15 is so designed that the rod 15 can only be moved between the sliding groove section 1011 and the locating groove sections 1012 within the stepped locating groove 101.

Figure 7A:
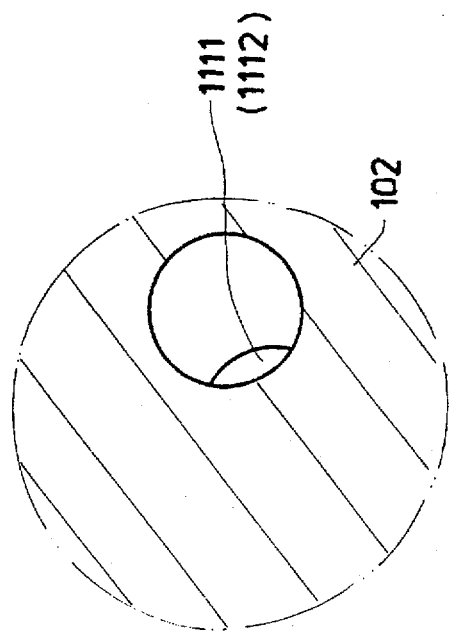
FIG. 7A is an enlarged sectional view showing the working principle of the present invention.
Figure 7:
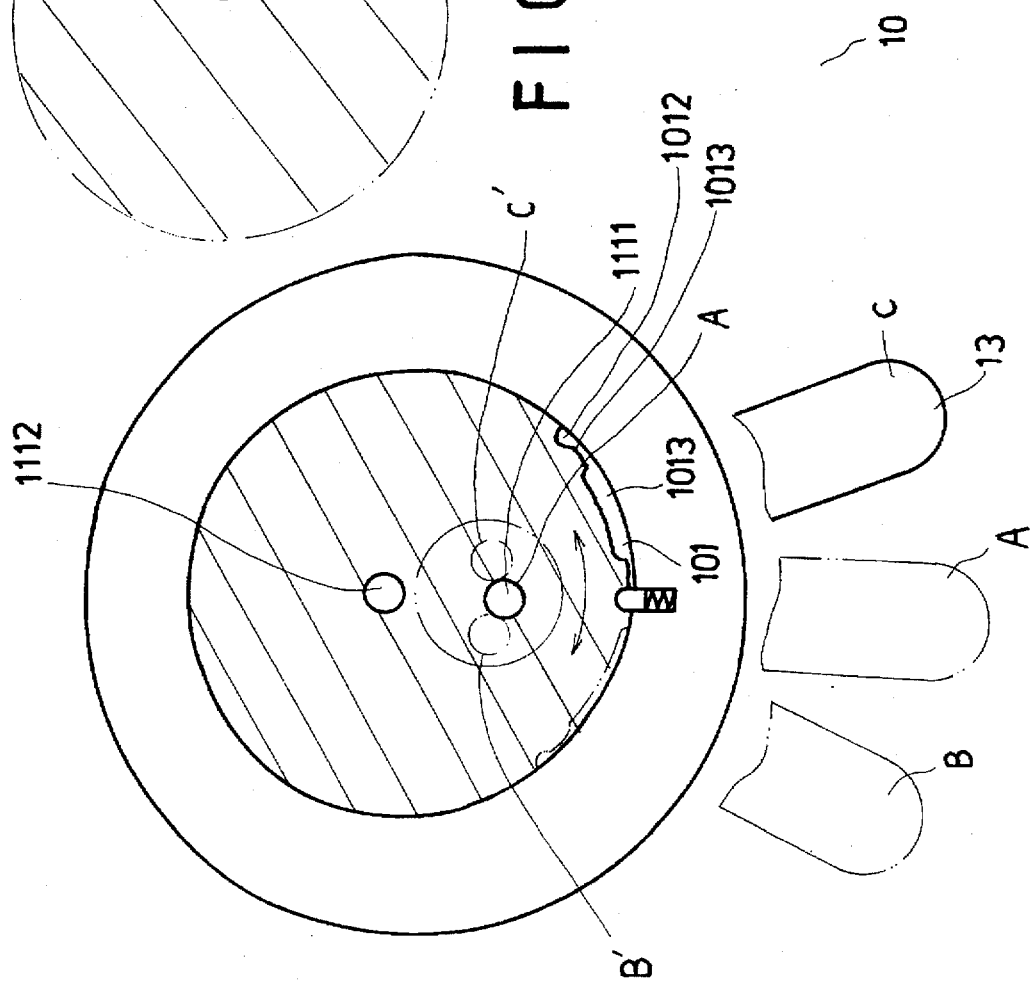
FIG. 7 is a cross section of FIG. 6.

Referring to FIGS. 6, 7 and 7A, when the water outlet pipe 13 is pushed by hand to position A, B, or C, the ball valve 10 is moved to the corresponding position A', B', or C', and the stepped locating groove 101 is relatively moved relative to the rod 15. When the water outlet pipe 13 is pushed to position B or C, the rod 15 is forced into engagement with one of the locating groove sections 1012, the water passage 102 of the ball valve 10 is shifted to position B' or C', and water is stopped from passing from the cold water inlet 1111 and the hot water inlet 1112 into the water passage 102, and therefore no water flows out of the water outlet pipe 13. When the water outlet pipe 13 is moved toward the center, the rod 15 passes over one borderline groove section 1013 into the sliding groove section 1011, permitting water to flow from the cold water inlet 1111 and/or the hot water inlet 1112 to the longitudinal water passage 132 of the water outlet pipe 13 through the water passage 102 of the ball valve 10. If to regulate the temperature of water, the water outlet pipe 13 is lifted or lowered. When the rod 15 passes over one borderline groove section 1013, a resisting force is give to the rod 15, and therefore the operator immediately acknowledge such a positioning change by means of the sense of touch. When the water outlet pipe 13 is lifted to the upper limit position E, the rod 15 is stopped at the top edge of the sliding groove section 1011, the water passage 102 of the ball valve 10 is moved to position E', the hot water inlet 1112 of the casing 11 is connected to the water passage 102 of the ball valve 10, the cold water inlet 1111 of the casing 11 is disconnected from the water passage 102 of the ball valve 10, therefore only hot water is allow to pass out of the water outlet pipe 13. On the contrary, when the water outlet pipe 13 is lowered to the lower limit position D, the rod 15 is stopped at the bottom edge of the sliding groove section 1011, the water passage 102 of the ball valve 10 is moved to position D', the cold water inlet 1111 of the casing 11 is connected to the water passage 102 of the ball valve 10, the hot water inlet 1112 of the casing 11 is disconnected from the water passage 102 of the ball valve 10, therefore only cold water is allow to pass out of the water outlet pipe 1. Therefore, the flowrate and temperature of water passing through the water outlet pipe 13 can be conveniently regulated by moving the water outlet pipe 13 to turn the ball valve 10 in the ball socket 111 of the casing 11.

I claim:
1. A hot/cold water flowrate control device, comprising:
a casing connected to a hot/cold water supply system, said casing comprising a ball socket at a top end thereof, a blind hole radially extending from said ball socket, a spring mounted in said blind hole, and a locating rod supported on said spring in said blind hole and forced by said spring to partially project into said ball socket, a cold water inlet and a hot water inlet adapted for receiving cold water and hot water from said hot/cold water supply system;
a hollow ball cap fixedly secured to said casing and covered over said ball socket;
a water outlet pipe defining a longitudinal water passage adapted for guiding out water from said casing; and
a ball valve mounted in the ball socket of said casing and turned therein by said water outlet pipe, said ball valve comprising a hollow neck extending out of said ball cap and fixedly connected to said water outlet pipe, a stepped locating groove in the periphery forced into engagement with said locating rod, and a substantially Y-shaped water passage adapted for connecting the cold water passage and hot water passage of said casing to the longitudinal water passage of said water outlet pipe, said stepped locating groove comprising a deep sliding groove section in the middle, two deep locating groove sections at two opposite sides of said deep sliding groove section, and two shadow borderline groove sections disposed between said deep sliding groove section and said deep locating groove sections;
wherein the cold water inlet and hot water inlet of said casing are disconnected from the water passage of said ball valve when one of the locating groove sections of said stepped locating groove is moved with said ball valve into engagement with said locating rod; the cold water inlet of said casing is connected to the water passage of said ball valve and the hot water inlet of said casing is disconnected from the water passage of said ball valve when said locating rod is moved in the sliding groove section of said stepped locating groove to an upper limit position; the hot water inlet of said casing is connected to the water passage of said ball valve and the cold water inlet of said casing is disconnected from the water passage of said ball valve when said locating rod is moved in the sliding groove section of said stepped locating groove to a lower limit position.

2. The hot/cold water flowrate control device as claimed in claim 1 wherein said water outlet pipe has an inner thread at one end connected to said ball valve, and the hollow neck of said ball valve is externally threaded and threaded into the inner thread of said water.

3. The hot/cold water flowrate control device as claimed in claim 1 wherein said casing has an outer thread and said hollow ball cap has an inner thread threaded onto the outer thread of said casing.

4. The hot/cold water flowrate control device as claimed in claim 1 further comprising a water seal ring mounted within an inside annular groove inside said hollow ball cap around the neck of said ball valve.

* * * * *